United States Patent
Owens, Jr.

(10) Patent No.: US 9,746,881 B2
(45) Date of Patent: Aug. 29, 2017

(54) APPARATUS FOR PORT EXPANSION

(71) Applicant: Phillip Q. Owens, Jr., Chicago, IL (US)

(72) Inventor: Phillip Q. Owens, Jr., Chicago, IL (US)

(*) Notice: Subject to any disclaimer, the term of this patent is extended or adjusted under 35 U.S.C. 154(b) by 0 days.

(21) Appl. No.: 15/064,121

(22) Filed: Mar. 8, 2016

(65) Prior Publication Data

US 2017/0205852 A1 Jul. 20, 2017

Related U.S. Application Data

(60) Provisional application No. 62/278,675, filed on Jan. 14, 2016.

(51) Int. Cl.
*G06F 1/16* (2006.01)
*H01R 27/02* (2006.01)
*H01R 31/06* (2006.01)

(52) U.S. Cl.
CPC .......... *G06F 1/1632* (2013.01); *G06F 1/1656* (2013.01); *G06F 1/1688* (2013.01); *H01R 27/02* (2013.01); *H01R 31/06* (2013.01)

(58) Field of Classification Search
CPC .... G06F 1/1632; G06F 1/1633; G06F 1/1605; G06F 1/1607
See application file for complete search history.

(56) References Cited

U.S. PATENT DOCUMENTS

| | | | | |
|---|---|---|---|---|
| 5,550,715 A * | 8/1996 | Hawkins | .............. | G02B 6/0066 362/191 |
| 5,586,002 A * | 12/1996 | Notarianni | ............ | G06F 1/1626 248/920 |
| 5,718,562 A * | 2/1998 | Lawless | .............. | A61M 5/1413 361/730 |
| 6,788,285 B2 * | 9/2004 | Paolucci | ............... | G06F 1/1626 200/176 |
| 6,848,662 B2 * | 2/2005 | Paramonoff | .............. | E05C 3/14 248/222.11 |
| 8,033,515 B2 * | 10/2011 | Martin | ................... | G06F 1/1607 248/224.61 |
| 8,092,251 B2 * | 1/2012 | Rosenblatt | ............. | B65D 75/52 439/536 |

(Continued)

FOREIGN PATENT DOCUMENTS

| | | |
|---|---|---|
| CN | 103294129 A | 9/2013 |
| CN | 103595828 A | 2/2014 |
| CN | 204576368 U | 8/2015 |

OTHER PUBLICATIONS

Murphy, Connor, "Panasonic Enhances Toughpad 4K Tablet for Improved Productivity in Creative, Technical Fields," at http://shop.panasonic.com/about-us-latest-news-press-releases/toughpad-4k.html; pp. 1-4; dated Apr. 13, 2015.

(Continued)

*Primary Examiner* — Anthony Q Edwards
(74) *Attorney, Agent, or Firm* — Quarles & Brady LLP

(57) ABSTRACT

A port expansion dock for a mobile electronic device comprises a housing, a connector positioned within the housing and configured to be connected to the mobile electronic device, and at least one video output port positioned within the housing and configured for a first connection to a first peripheral device.

17 Claims, 4 Drawing Sheets

(56) References Cited

U.S. PATENT DOCUMENTS

| | | | | |
|---|---|---|---|---|
| 8,167,126 B2* | 5/2012 | Stiehl | G06F 1/1656 |
| | | | 206/305 |
| 8,180,095 B2* | 5/2012 | Zhang | H04R 1/025 |
| | | | 381/334 |
| 8,312,991 B2* | 11/2012 | Diebel | A45C 11/00 |
| | | | 206/305 |
| 8,867,198 B2* | 10/2014 | Steele | A45C 11/00 |
| | | | 206/320 |
| 8,942,748 B2* | 1/2015 | Nylund | H04B 5/0006 |
| | | | 455/404.2 |
| 8,947,868 B2* | 2/2015 | Motoishi | G06F 1/1613 |
| | | | 361/679.21 |
| 9,223,346 B2 | 12/2015 | Wilson | |
| 2004/0057199 A1* | 3/2004 | Azuchi | G06F 1/1626 |
| | | | 361/679.3 |
| 2008/0123285 A1* | 5/2008 | Fadell | G06F 1/1632 |
| | | | 361/679.41 |
| 2008/0123287 A1* | 5/2008 | Rossell | G06F 1/1632 |
| | | | 361/679.3 |
| 2010/0124040 A1* | 5/2010 | Diebel | G06F 1/1628 |
| | | | 361/816 |
| 2012/0092377 A1* | 4/2012 | Stein | F16M 11/041 |
| | | | 345/649 |
| 2012/0172090 A1* | 7/2012 | Capps | H04M 1/04 |
| | | | 455/566 |
| 2012/0228169 A1* | 9/2012 | Huang | G06F 1/1626 |
| | | | 206/320 |
| 2013/0183943 A1 | 7/2013 | Tow et al. | |
| 2013/0235521 A1* | 9/2013 | Burch | G06F 1/1635 |
| | | | 361/679.48 |
| 2013/0336510 A1* | 12/2013 | Lee | G06F 1/1632 |
| | | | 381/333 |
| 2016/0085272 A1* | 3/2016 | Chien | G06F 13/4022 |
| | | | 361/679.4 |
| 2016/0286014 A1* | 9/2016 | Balogh | G06F 3/015 |

OTHER PUBLICATIONS

CDW, Speck iGuy—Case for Tablet; Mfg. Part: SPK-A1518 | CDW Part: 3254764 | UNSPSC: 53121705; at https://www.cdw.com/shop/products/Speck-iGuy-case-for-tablet; pp. 1-3; at least as early as Feb. 12, 2016.

* cited by examiner

APPARATUS FOR PORT EXPANSION

RELATED APPLICATIONS

The present application claims the benefit of U.S. Provisional Application Ser. No. 62/278,675, filed on Jan. 14, 2016, entitled "Tablet Case with Back Up Battery, USB, DVI, VGA and HDMI Ports", the disclosure of which is hereby incorporated by reference in its entirety.

FIELD OF THE DISCLOSURE

The disclosure relates generally to a dock for a mobile electronic device, and more particularly, a port expansion dock for a mobile electronic device.

BACKGROUND

Mobile electronic devices, such as smartphones, tablets, portable computers, and the like, undergo several design trade-offs to balance performance capabilities with overall shape and size. Due to such trade-offs, mobile electronic devices oftentimes lack standard video output ports that exist in more traditional non-mobile electronic devices like desktop computers, such as video graphics array (VGA) ports, digital visual interface (DVI) ports, Thunderbolt ports, high definition multimedia interface (HDMI) ports, and the like. As a result, users of such mobile electronic devices are not able to connect their devices to a video display device, such as a computer monitor, projector, or television, to project content from their devices, such as TV shows, movies, business presentations, and music. Mobile electronic devices also lack standard data output ports that exist in more traditional non-mobile electronic devices like desktop computers, such as a universal serial bus (USB) port.

Currently, if, for example, a user desires to use a tablet to charge the battery of a cell phone via a USB cable, and also desires to use a television to project media played on his tablet via an HDMI cable, the user would need to switch out a dedicated USB adaptor that is being used to receive the USB cable with a dedicated HDMI adaptor to receive the HDMI cable. As another example, if a user desires to use a tablet to import data via a USB cable or USB jump drive, and also desires to use a projector to display a business presentation from his tablet via a VGA cable, the user would need to switch out a dedicated USB adaptor that is being used to receive the USB cable or USB jump drive with a dedicated VGA adaptor to receive the VGA cable. With the rise in popularity and advancement of mobile electronic devices, users often desire to use their mobile electronic devices in place of non-mobile electronic devices that provide the same standard ports that are accessible in non-mobile electronic devices.

Accordingly, what is needed is an all-in-one mechanism that allows users to use their mobile electronic devices to communicate with multiple peripheral devices via a plurality of video output ports and data output ports, where the mechanism may also be configured to integrate with a case to protect the mobile electronic device.

SUMMARY

In illustrative embodiments, a port expansion dock for a mobile electronic device is disclosed. The dock includes a housing, a connector positioned within the housing and configured to be connected to the mobile electronic device and at least one video output port positioned within the housing and configured for a first connection to a first peripheral device. The video output port may be a video graphics array (VGA) port, a digital visual interface (DVI) port, a thunderbolt port, a high definition multimedia interface (HDMI) port, or any other suitable port that facilitates transmission of video signals for display. The dock may also include a data output port positioned within the housing and configured for a second connection to a second peripheral device at the same time as the first connection. The data output port may be a universal serial bus (USB) port or any other suitable port that facilitates transfer of data from one data storage medium to another data storage medium. The dock may also include a speaker positioned within the housing.

A case for a mobile electronic device is also disclosed. The case may include a body configured to be secured to the mobile electronic device, the body having first and second ends. The port expansion dock described above may be coupled to the first end of the body. The body of the case may include first and second sides extending between the first and second ends, a rear surface extending between the first and second sides and the first and second ends, and a partial front surface extending from at least one of the first and second sides or first and second ends. The case may include a supporting plane coupled to the rear surface of the body of the case, and first and second flaps extending from first and second edges of the supporting plane. The first and second flaps may be configured to enclose at least a portion of the front surface of the body of the case. The first flap may have a length that is either greater than or less than the second flap. The first flap may include a buckle and the second flap may include a strap, wherein the buckle and strap cooperate to secure the first and second flaps in a closed position. Alternatively, the first flap may include the strap and the second flap may include the buckle. The configuration of the first and second flaps may emulate a briefcase.

Among other advantages, a port expansion dock configured to integrate with a case for the mobile electronic device allows users to use their mobile electronic devices to simultaneously communicate with multiple peripheral devices. The compact nature of the port expansion dock that is configured to integrate with a case for the mobile electronic device also allows users to easily carry the mobile electronic device inside a carrying case and to assemble the carrying case to support positioning of the mobile electronic device for use.

BRIEF DESCRIPTION OF THE DRAWINGS

The embodiments will be more readily understood in view of the following description when accompanied by the below figures and wherein like reference numerals represent like elements.

DETAILED DESCRIPTION

Figure 1:
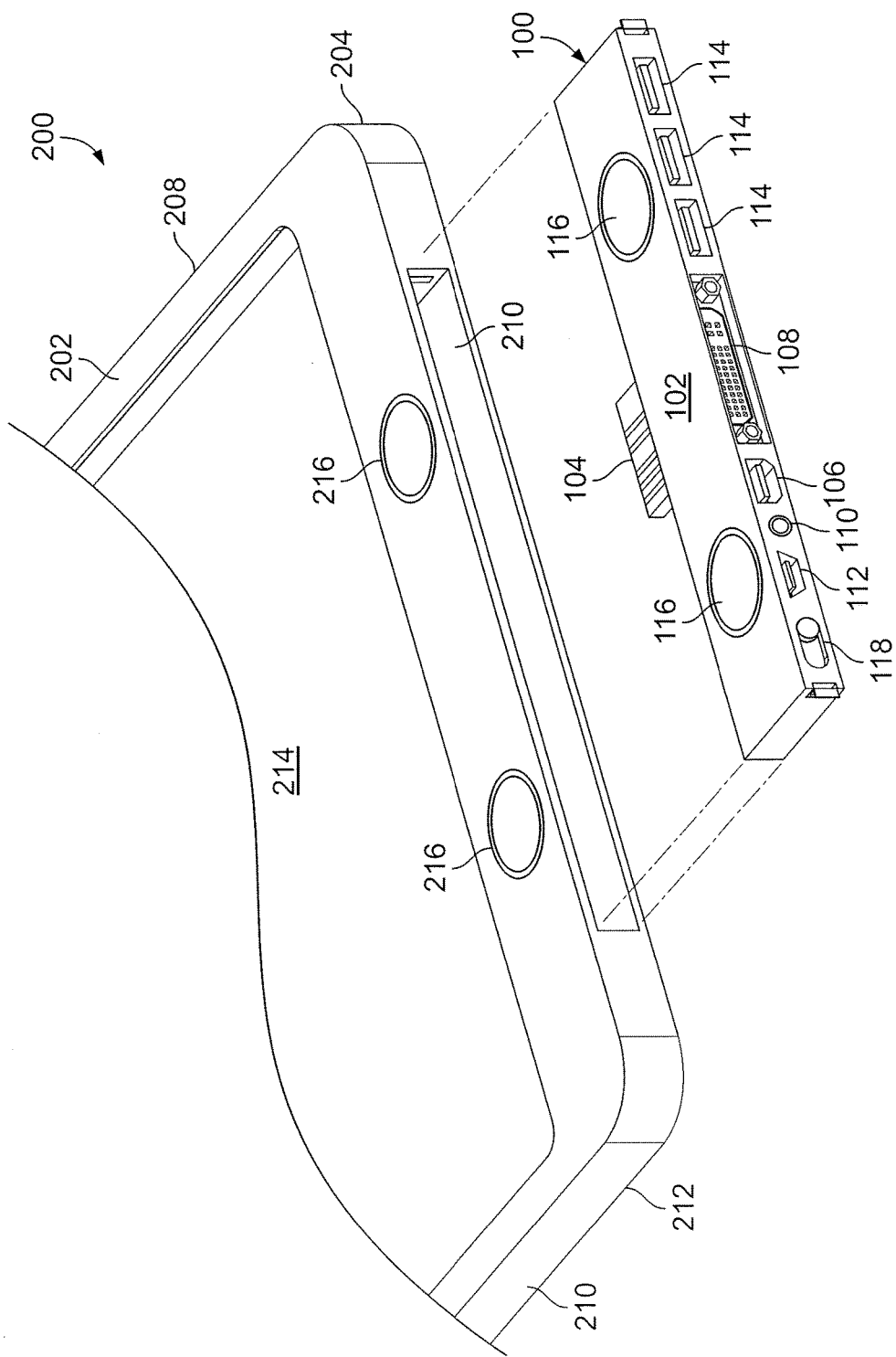
FIG. 1 is a perspective view illustrating a port expansion dock configured to be coupled to a case for a mobile electronic device.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 is a perspective view illustrating a port expansion dock 100 configured to be coupled to a mobile electronic device and/or a mobile electronic device case 200. The port expansion dock 100 includes a housing 102 and a connector 104 formed within and extending from the housing 102. The housing 102 also includes one or more video output ports, such as a DVI port 106, a VGA port 108, a thunderbolt port 110, and/or a HDMI port 112, as well as several data output ports, such as one or more USB ports 114. While multiple video and data ports are depicted, one skilled in the art will understand that any number of ports may be utilized and/or any suitable video and/or data ports may be utilized. The connector 104 may be configured to be connected to a mobile electronic device, and communicatively coupled to any of the aforementioned ports, to thereby make available the aforementioned ports to the mobile electronic device. An example of the connector 104 is a 30-pin connector or a lighting connector for Apple's iPad. The housing 102 may also include one or more of a speaker(s) 116, a fastener 118, and a battery (not pictured) to provide backup power to the mobile electronic device or to another device through, for example, the one or more USB ports 114. Any number of the ports may be utilized at different times or at the same time. In an illustrative example, one of the video output ports may be configured to connect to a peripheral device, such as a computer monitor, and one of the data output ports may be simultaneously configured to connect to another peripheral device, such as a smartphone. Accordingly, the dock 100 allows a user to use his mobile electronic device to simultaneously communicate with multiple peripheral devices via a plurality of video output ports and/or data output ports.

Figure 2:
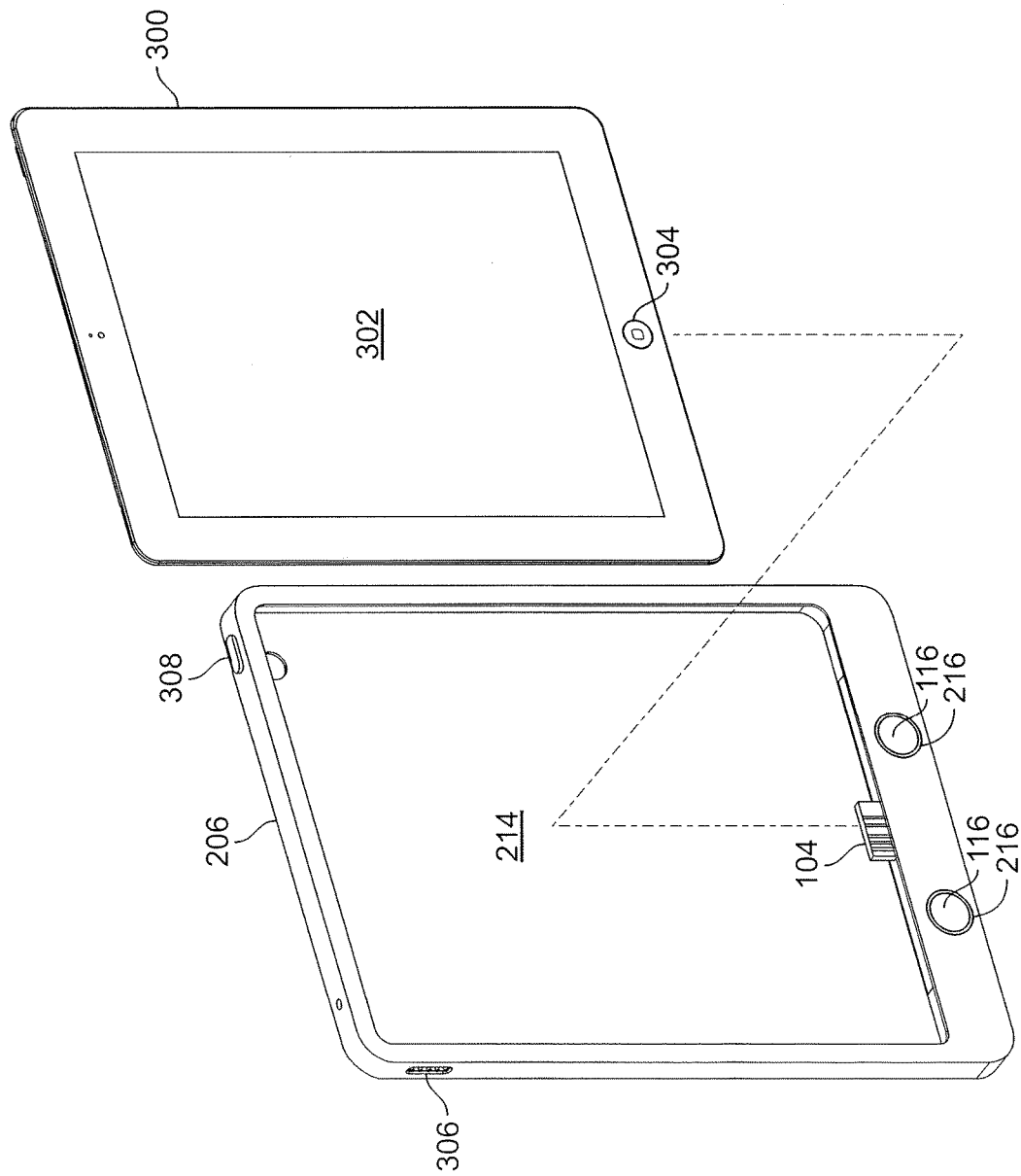
FIG. 2 is an exploded perspective view illustrating a mobile electronic device configured to be coupled to a case having a port expansion dock integral therewith.

The port expansion dock 100 may be coupled to a case 200. In one illustrative example, as seen in FIGS. 1-4, the case 200 includes a body 202 configured to be secured to a mobile electronic device. The body 202 has a first end 204 and a second 206, as shown in FIG. 2. The dock 100 may be coupled to the first end 204 of the body 202. For example, the first end 204 may include a cavity 210 through which the dock 100 is removably inserted. The dock 100 may include one or more fasteners 118 that removably attach the dock 100 to the case 200, for example, one or more latches that enter grooves (not pictured) within an inside wall of the cavity 210 to couple the dock 100 to the case 200, or may be unlatched for removal of the dock 100. Any other suitable fastener(s) may be utilized to attach the dock 100 to the case 200.

The body 202 may also include a first side 208 and a second side 210 that extend between the first end 204 and the second end 206, a rear surface 212 extending between the first side 208 and the second side 210 and between the first end 204 and the second end 206, and a partial front surface 214 extending from the first side 208 and the second side 210, the first end 204 and the second end 206, or both. The body 202 may further include openings 216 to allow speaker (s) 116, buttons, or other features of the dock 100 to protrude.

Figure 4:
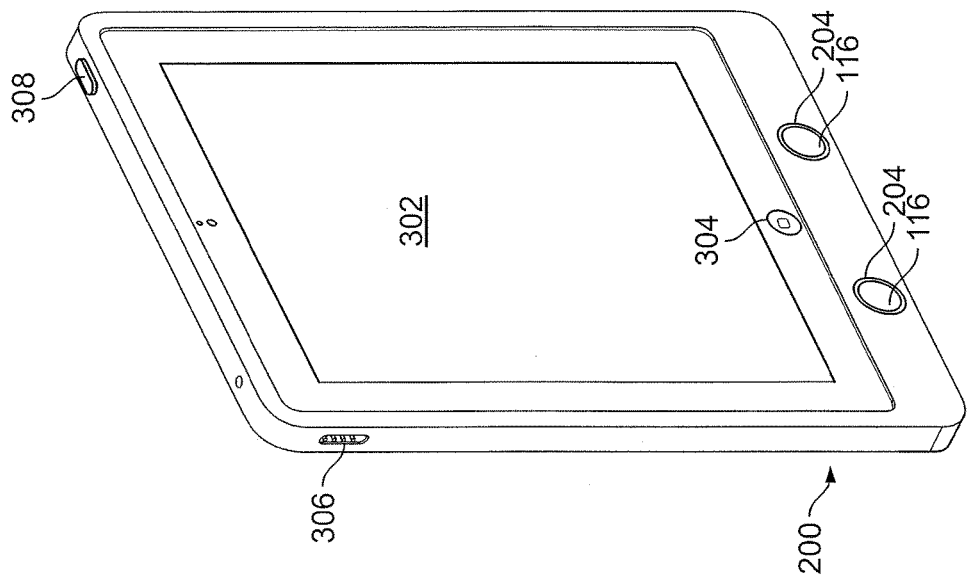
FIG. 4 is a front and top perspective view illustrating the mobile electronic device, case, and port expansion dock of FIG. 3.
Figure 3:
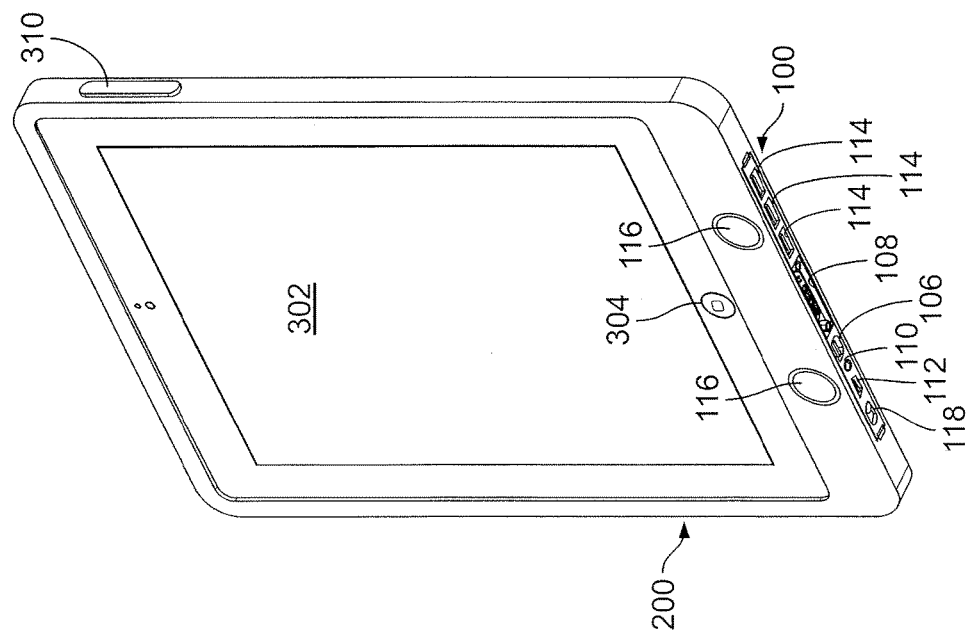
FIG. 3 is a front and bottom perspective view illustrating a mobile electronic device coupled to the case with the port expansion dock of FIG. 2.

FIG. 2 is a perspective view illustrating of the case 200 with the port expansion dock 100 with the case 200 coupled thereto. For example, connector 104 of the dock 100 may be a male connector for connecting to a female connector (not shown) of the mobile electronic device 300. The body 202 of the case 200 may be configured to be secured to the mobile electronic device 300, such as by receiving the outer perimeter of the mobile electronic device 300, such that the display 302 and home key 304 of the mobile electronic device 300 are unhindered from view and from use by the user. The body 202 may further include openings to allow a volume button 310 of the mobile electronic device 300 to remain unhidden from view, as shown in FIG. 3. It is to be understood that the body 202 may be configured to allow any other ports or buttons of the mobile electronic device 300 to remain unhidden from view, for example, a MagSafe power port 306 and a power button 308 of the mobile electronic device 300 as shown in FIG. 4. Accordingly, the dock 100 that allows a user to use his mobile electronic device to simultaneously communicate with multiple peripheral devices via a plurality of video output ports and data output ports is also configured to integrate with the case 200 to protect the mobile electronic device 300.

While the case 200 is depicted within a particular configuration, it should be understood that the principles of the present application may be implemented within any case that is configured for attachment to a mobile electronic device. Further, while the dock 100 of the present disclosure is shown as being utilized with a case 200, in some embodiments, the dock 100 may be configured for use without a case. In an illustrative example, the dock 100 may have one or more dimensions (for example, a width) that are the same as dimensions of the mobile electronic device, such that the dock 100 acts as an extension of the mobile electronic device.

Figure 5:
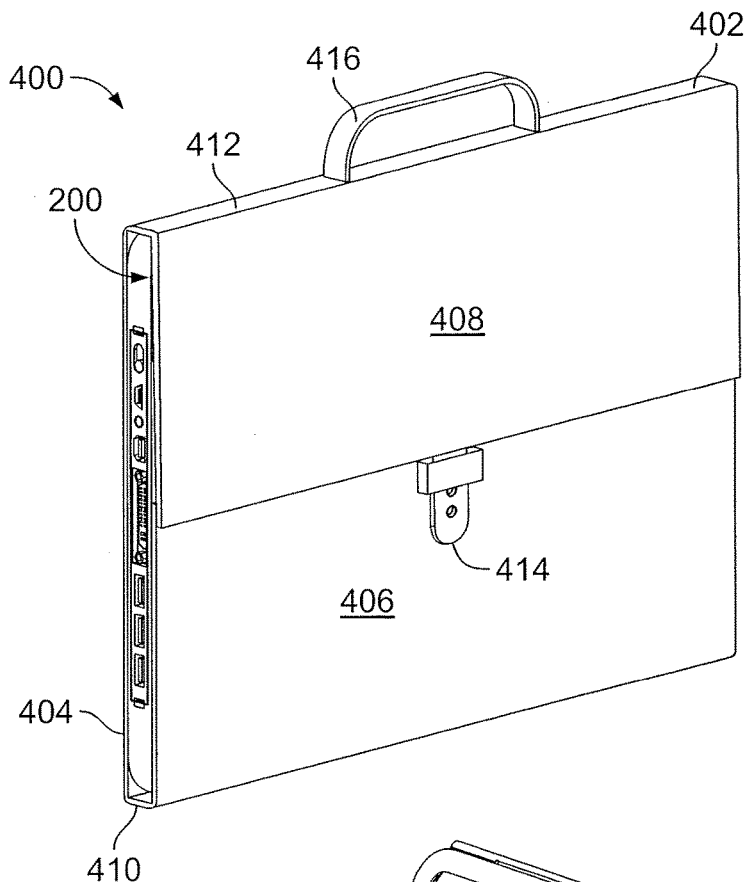
FIG. 5 is a perspective view illustrating a carrying case for holding the case with integral port expansion dock of FIG. 3, wherein the mobile electronic device is coupled to the case.

FIG. 5 is a perspective view illustrating an embodiment of a carrying case 400 including the case 200, the port expansion dock 100, and the mobile electronic device 300. The case 200 may be integral with or detachably attached (for example, by Velcro® or any other suitable fastener) to the carry case 400. The carrying case 400 includes a cover 402, which in turn includes a supporting plane 404 coupled to the rear surface 212 of the body 202 of the case 200. The cover 402 further includes a first flap 406 and a second flap 408 extending from a first edge 410 and a second edge 412, respectively, of the supporting plane 404. The first flap 406 and the second flap 408 are configured to enclose at least a portion of the front surface 214 of the body 212 of the case 200. The first flap 406 may have a length L1 that is less than, greater than, or equal to a length L2 of the second flap 408. In addition, the first flap 406 may include a buckle 414 and the second flap 408 may include the strap 416. Alternatively, the first flap 406 may include the strap 416 and the second flap 408 may include the buckle 414. The buckle 414 and the strap 416 cooperate to secure the first flap 406 and the second flap 408 in a closed position. The configuration of the first flap 406 and the second flap 408 may emulate a briefcase. Optionally, the first and second flaps 406, 408 may be secured to one another in any other suitable manner, for example, by a latch(es), magnet(s), clip(s), or any other suitable fastener(s).

Figure 6:
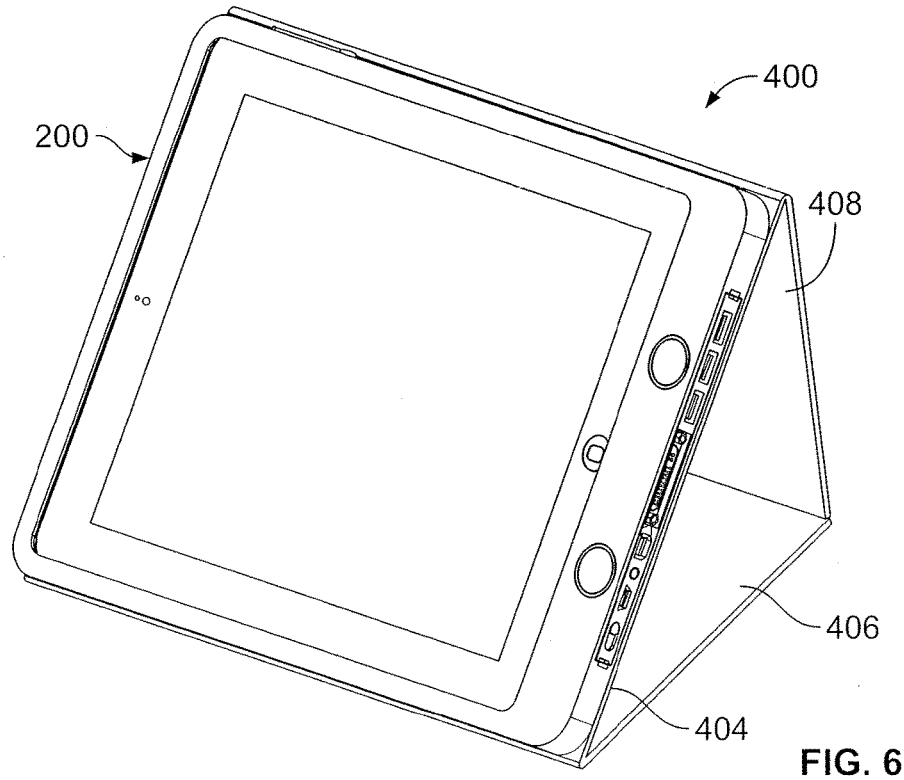
FIG. 6 is a perspective view illustrating a further carrying case for holding the case with integral port expansion docket of FIG. 3, wherein the mobile electronic device is coupled to the case.

FIG. 6 is a perspective view illustrating another embodiment of a carrying case 400 configured for use with the case 200, the port expansion dock 100, and/or the mobile electronic device 300. Specifically, the carrying case 400 is configured to act as a stand for the mobile electronic device 300. The first flap 406 may act as base support by resting on a surface, such as a table, the user's lap, or any other suitable surface on which the mobile electronic device 300 is placed on for support. The second flap 408 may adjust the angle between the supporting plane 404 and the first flap 406, thereby adjusting the tilt of the mobile electronic device 300 with respect to the surface. The features of FIG. 6 may be incorporated within the carrying case 400 of FIG. 5, thereby allowing the briefcase-type carrying case 400 to also act as a stand.

The compact nature of the port expansion dock 100 that is configured to integrate with the case 200 for the mobile electronic device 300 also allows users to easily carry the mobile electronic device 300 inside the carrying case 400 and to assemble the carrying case 400 to support positioning of the mobile electronic device 300 for use.

While not shown, the carrying case 400 may include one or more pockets for holding papers or other materials. The pocket(s) may be formed, for example, in one or more of the first and second flaps 406, 408.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

What is claimed is:

1. A port expansion dock for a mobile electronic device, the port expansion dock comprising:
   housing;
   a connector positioned within the housing and configured to be connected to the mobile electronic device;
   at least one video output port positioned within the housing and configured for a first connection to a first peripheral device;
   at least one data output port positioned within the housing and configured for a second connection to a second peripheral device at the same time as the first connection; and
   a fastener positioned within the housing and configured for coupling the port expansion dock to a case.

2. The port expansion dock of claim 1, wherein the at least one video output port is selected from a group comprising:
   a video graphics array (VGA) port; and
   a digital visual interface (DVI) port.

3. The port expansion dock of claim 2, wherein the group further comprises a thunderbolt port.

4. The port expansion dock of claim 3, wherein the group further comprises a high definition multimedia interface (HDMI) port.

5. The port expansion dock of claim 1 further comprising a speaker positioned within the housing.

6. The port expansion dock of claim 5, wherein the at least one data output port is a universal serial bus (USB) port.

7. A case for a mobile electronic device, the case comprising:
   a body configured to be secured to the mobile electronic device, the body having first and second ends; and
   a port expansion dock coupled to the first end of the body, the port expansion dock comprising:
      a housing;
      a connector positioned within the housing and configured to be connected to the mobile electronic device;
      at least one video output port positioned within the housing and configured for a first connection to a first peripheral device; and
      a fastener positioned within the housing and configured for coupling the port expansion dock to the body.

8. The case of claim 7, wherein the body includes first and second sides extending between the first and second ends, a rear surface extending between the first and second sides and the first and second ends, and a partial front surface extending from at least one of the first and second sides or first and second ends.

9. The case of claim 8, further comprising a cover comprising:
   a supporting plane coupled to the rear surface of the body of the case; and
   first and second flaps extending from first and second edges of the supporting plane, the first and second flaps configured to enclose at least a portion of the front surface of the body of the case.

10. The case of claim 9, wherein one of the first and second flaps has a length that is less than the other of the first and second flaps.

11. The case of claim 10, wherein one of the first and second flaps includes a buckle and the other of the first and second flaps includes a strap, wherein the buckle and strap cooperate to secure the first and second flaps in a closed position and the configuration of the first and second flaps emulates a briefcase.

12. The case of claim 7, wherein the at least one video output port is selected from a group comprising:
   a video graphics array (VGA) port; and
   a digital visual interface (DVI) port.

13. The case of claim 12, wherein the group further comprises a thunderbolt port.

14. The case of claim 13, wherein the group further comprises a high definition multimedia interface (HDMI) port.

15. The case of claim 7, wherein the port expansion dock further comprises at least one data output port positioned within the housing and configured for a second connection to a second peripheral device at the same time as the first connection.

16. The case of claim 15, wherein the at least one data output port is a universal serial bus (USB) port.

17. The case of claim 15, wherein the port expansion dock further comprises a speaker positioned within the housing.

\* \* \* \* \*